United States Patent
Russell

(10) Patent No.: US 10,872,032 B1
(45) Date of Patent: Dec. 22, 2020

(54) SYSTEMS AND METHODS FOR SOFTWARE DEVELOPMENT USING SANDBOX VIEWS

(71) Applicant: United Services Automobile Association (USAA), San Antonio, TX (US)

(72) Inventor: Ryan Russell, San Antonio, TX (US)

(73) Assignee: United Services Automobile Association (USAA), San Antonio, CA (US)

( * ) Notice: Subject to any disclaimer, the term of this patent is extended or adjusted under 35 U.S.C. 154(b) by 0 days.

(21) Appl. No.: 15/692,692

(22) Filed: Aug. 31, 2017

Related U.S. Application Data

(60) Provisional application No. 62/382,440, filed on Sep. 1, 2016.

(51) Int. Cl.
  *G06F 11/36* (2006.01)
  *G06F 21/53* (2013.01)
  (Continued)

(52) U.S. Cl.
  CPC .......... *G06F 11/3664* (2013.01); *G06F 8/20* (2013.01); *G06F 8/30* (2013.01); *G06F 11/3656* (2013.01);
  (Continued)

(58) Field of Classification Search
  CPC .... G06F 11/3656; G06F 11/3664; G06F 8/34; G06F 9/45558; G06F 21/53; H04L 63/104
  (Continued)

(56) References Cited

U.S. PATENT DOCUMENTS 6,868,370 B1 * 3/2005 Burbridge .............. G06Q 10/06
  703/1
8,151,365 B2 * 4/2012 Chen ................... G06F 21/6209
  717/110
(Continued)

OTHER PUBLICATIONS

Jain, A., et al., YAM-A Framework for Rapid Software Development, 2nd IEEE International Conference on Space Mission Challenges for Information Technology (SMC-IT'06), Jul. 17-20, 2006, 10 pages, [retrieved on Oct. 5, 2020], Retrieved from the Internet: <URL:http://ieeexplore.ieee.org/>.*

Primary Examiner — Geoffrey R St Leger
(74) Attorney, Agent, or Firm — Fletcher Yoder, P.C.

(57) ABSTRACT

The current embodiments relate to systems and methods for providing a virtual sandbox. In one embodiment, an electronic request is received at a centralized virtual sandbox hosting service. The electronic request requests a virtual sandbox session. In response to the received request, a particular project, a particular platform, and/or a particular environment is determined. Based upon the particular project, the particular platform, and/or the particular environment a particular codebase from a set of codebases stored at a code store is selected. At the centralized virtual sandbox hosting service, a virtual sandbox is generated, the virtual sandbox provides an integrated development environment for the particular codebase. A virtual sandbox view is then provided at the remote client to enable a user of the remote client computer to see and perform interactions with the integrated development environment at the centralized virtual sandbox hosting service, via the remote client computer.

20 Claims, 5 Drawing Sheets

(51) Int. Cl.
*H04L 29/06* (2006.01)
*G06F 8/20* (2018.01)
*G06F 8/30* (2018.01)
*G06F 8/34* (2018.01)
*G06F 9/455* (2018.01)

(52) U.S. Cl.
CPC ............ *G06F 21/53* (2013.01); *H04L 63/104* (2013.01); *G06F 8/34* (2013.01); *G06F 9/45558* (2013.01)

(58) Field of Classification Search
USPC ................. 717/110, 113, 124, 125, 134, 135
See application file for complete search history.

(56) References Cited

U.S. PATENT DOCUMENTS

| | | | | |
|---|---|---|---|---|
| 8,245,192 B1* | 8/2012 | Chen | .......................... | G06F 8/71 717/103 |
| 8,799,862 B2* | 8/2014 | Adamson | ............ | G06F 11/3664 717/102 |
| 8,868,608 B2* | 10/2014 | Friedman | ............. | G06F 11/3664 707/787 |
| 9,052,933 B2* | 6/2015 | Astete | ................. | G06F 9/45533 |
| 9,183,121 B2* | 11/2015 | Pruss | ...................... | H04L 43/50 |
| 9,910,762 B2* | 3/2018 | Chandra | ............. | G06F 11/3668 |
| 2003/0033372 A1* | 2/2003 | Shimada | ................ | H04L 51/14 709/206 |
| 2007/0239725 A1* | 10/2007 | Bhat | .................... | G06F 16/9574 |
| 2011/0154441 A1* | 6/2011 | Oh | ............................ | G06F 8/20 726/3 |
| 2011/0296487 A1* | 12/2011 | Walsh | ..................... | G06F 21/53 726/1 |
| 2012/0331441 A1* | 12/2012 | Adamson | ............ | G06F 11/3664 717/102 |
| 2013/0290506 A1* | 10/2013 | Astete | ................ | G06F 9/45533 709/223 |
| 2014/0208220 A1* | 7/2014 | Watal | ...................... | H04L 67/10 715/738 |
| 2015/0026667 A1* | 1/2015 | Pruss | ..................... | H04L 43/50 717/135 |
| 2017/0052879 A1* | 2/2017 | Chandra | ............. | G06F 11/3668 |
| 2017/0161026 A1* | 6/2017 | Wood | ................. | G06F 9/45558 |

* cited by examiner

SYSTEMS AND METHODS FOR SOFTWARE DEVELOPMENT USING SANDBOX VIEWS

CROSS REFERENCE TO RELATED APPLICATIONS

This application claims priority from and the benefit of U.S. Provisional Application Ser. No. 62/382,440, entitled "SYSTEMS AND METHODS FOR SOFTWARE DEVELOPMENT USING SANDBOX VIEWS," filed Sep. 1, 2016, which is hereby incorporated by reference.

BACKGROUND

The present disclosure relates generally to systems and methods for enhanced software development experiences. More specifically, the present disclosure relates to centralized virtual development sandboxes.

Software development is a highly complex field where erroneous code (e.g., "bugs") may be introduced when code modifications are not properly tested prior to implementation in software products. Accordingly, software developers have created sandboxes, or testing environments that isolate untested code, in an effort to identify and correct coding defects prior to integration into production level code. As used herein, the term sandbox may be defined as an environment that isolates untested code changes and/or experimentation from public and/or production codebases. Sandboxes may replicate at least the minimum functionality useful to accurately test code in an isolated environment.

To create these sandbox environments, developers oftentimes copy code from a remote code repository to a local development machine, where code modification and testing may be completed. Upon satisfaction with the code modifications, the modified code is re-transmitted back to the remote code repository, where complex processing algorithms may determine what changes have been made to the code and apply the code changes to the production level code.

Unfortunately, significant bandwidth and computing resources may be necessary for these sandboxing schemes. For one, as the number of users accessing and modifying code increases, significant network bandwidth may be consumed by the code transfer from the remote code repository and back to the remote code repository. Further, the tasks of making code modifications locally may require significant processing resources at the local sandbox, while merging code modifications remotely may require significant processing resources to define and merge code modifications into base content.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a tangible, non-transitory, machine-readable medium, includes machine-readable instructions. The machine-readable instructions cause a hardware-based processor to: receive, at a centralized virtual sandbox hosting service, an electronic request from a remote client computer, the electronic request requesting a virtual sandbox session; in response to the received request, determine a particular project, a particular platform, a particular environment, or any combination thereof; based upon the particular project, the particular platform, the particular environment, or the any combination thereof, selecting a particular codebase from a set of codebases stored at a code store; generate, at the centralized virtual sandbox hosting service, a virtual sandbox, the virtual sandbox configured to provide an integrated development environment for the particular codebase; and present to the remote client computer a virtual sandbox view, the virtual sandbox view enabling a user of the remote client computer to see and perform interactions with the integrated development environment at the centralized virtual sandbox hosting service, via the remote client computer.

In a second embodiment, a computer-implemented method, includes providing, to a centralized virtual sandbox hosting service, an electronic request from a remote client computer, the electronic request requesting a virtual sandbox session. The method also includes receiving, at the remote client computer, data indicative of a virtual sandbox view, the virtual sandbox view enabling a user of the remote client computer to see and perform interactions with an integrated development environment at the centralized virtual sandbox hosting service, via the remote client computer and rendering, via the remote client computer, the virtual sandbox view. The virtual sandbox view is representative of a virtual sandbox generated at the centralized virtual sandbox hosting service, the virtual sandbox providing an integrated development environment for modifications to a particular codebase associated with a particular project, a particular platform, a particular environment, or any combination thereof.

In a third embodiment, a development system, includes: a sandbox hosting service. The sandbox hosing service receives an electronic request from a remote client computer, the electronic request requesting a virtual sandbox session; selects a particular codebase from a set of codebases stored at a code store for the virtual sandbox session; and generates the virtual sandbox, the virtual sandbox configured to provide an integrated development environment for the particular codebase. The development system also includes a remote client computer. The client computer renders a virtual sandbox view of the virtual sandbox and receives and provides interactions with the integrated development environment at the centralized virtual sandbox hosting service, via the virtual sandbox view.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The current embodiments relate to creation and usage of virtual sandboxes. Virtual sandboxes, as used herein, refer to centralized sandboxes that are formed and modified remote from a client computer where the code modifications are initially supplied. For example, as will be discussed in more detail herein, a client computer may receive a virtual view of a sandbox that resides and is maintained by centralized data services.

By maintaining a centralized sandbox where code may be modified and remotely tested, many efficiencies may be observed. For example, when the code base and modifications exist at the same centralized location, less network bandwidth may be used, because a codebase for the sandbox does not have to be provided, via network resources, to a local environment from a code store. Similarly, the modified codebase does not have to be provided, via the network resources, back to the code store after modification in a local sandbox. Further, by maintaining a centralized sandbox, computing resources may be preserved. For example, virtual machines may be centrally generated, which only use an amount of resources deemed necessary for sandbox development by a remote user. In contrast, in a local sandbox approach, computing resources for each potential local sandbox environment may be pre-defined, prior to creation of the sandbox, which may result in excessive hardware requirements.

Present embodiments are generally directed toward centralized virtual development sandboxes that may be accessed by remote clients. In particular, the current embodiments provide a hardware-implemented solution for generating such virtual centralized sandboxes by accessing and isolating a snapshot of a relevant code base and presenting a remote client with a view of a centralized sandbox that enables development of the snapshot of the relevant code base. The codebase may be inserted into a code stream (e.g., a non-isolated codebase), may be saved for subsequent use in a new virtual sandbox session, or may be wiped.

Figure 1:
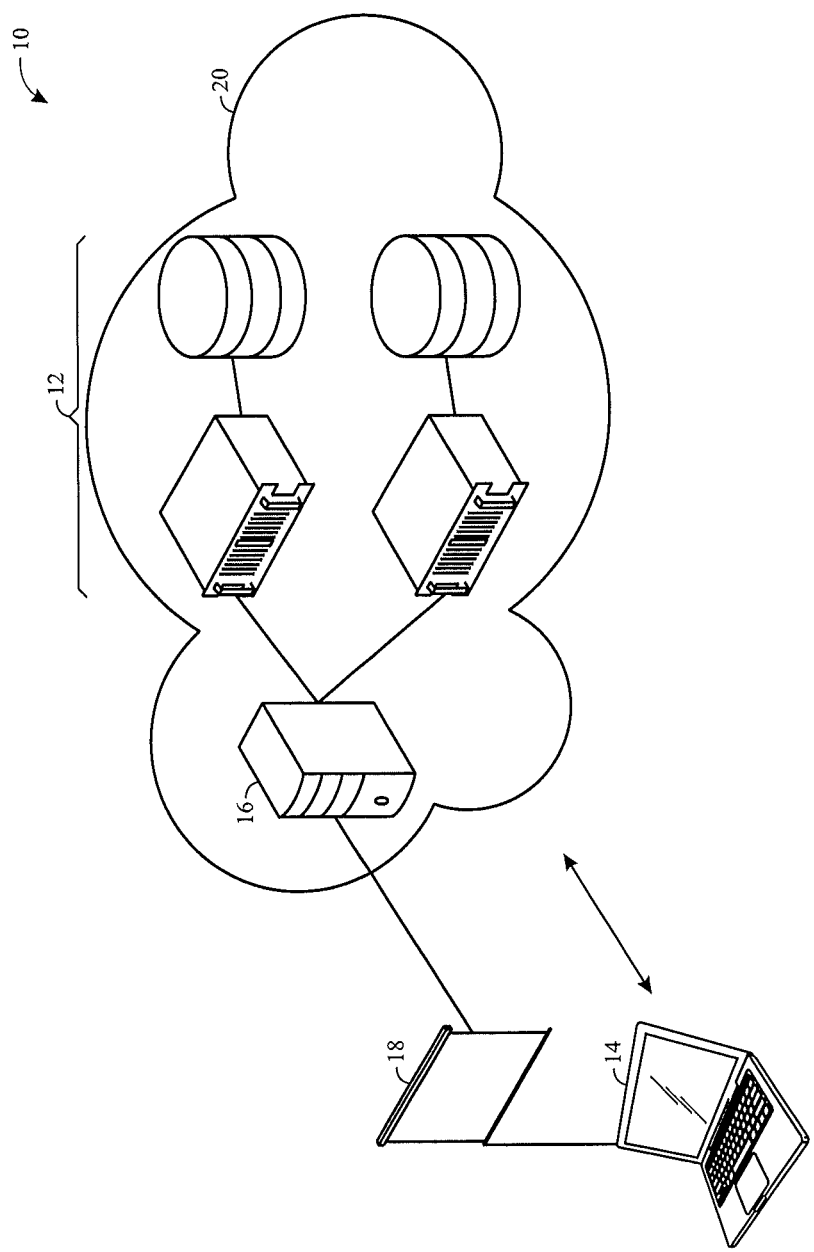
FIG. 1 is a schematic diagram illustrating a system that provides a centralized virtual sandbox, in accordance with embodiments described herein.

FIG. 1 is a schematic diagram illustrating a system 10 that provides a centralized virtual sandbox, in accordance with embodiments described herein. A code store 12 (e.g., network attached storage (NAS), tangible, non-transitory machine readable medium, etc.) may store a non-isolated codebase (e.g., a set of computer instructions for performing particular computing tasks). A client computer 14 may access a virtual sandbox service 16 (e.g., residing on one or more virtual sandbox servers), which may generate a virtual sandbox and present a virtual sandbox view 18 to the remote client computer 14.

The virtual sandbox view 18 may provide a graphical user interface (GUI) that provides an isolated snapshot of the non-isolated codebase stored in the code store 12. Further, the virtual sandbox view 18 may provide a user of the remote client 14 the ability to provide user inputs, which modify the isolated snapshot. As the changes are registered from the client computer 14 via the view 18 to the virtual sandbox hosting service 16, the service 16 may locally update the virtual sandbox. Further, upon instruction from the client computer 14, the service 16 may execute the isolated codebase of the virtual sandbox, enabling the isolated codebase to be executed local to the service 16 (e.g., at the same data center and/or on the same server as the server hosting the service 16). As may be appreciated, by isolating the codebase, modifications made to the codebase may be implemented, executed, and tested without affecting a non-isolated version of the code. Thus, adverse effects of modifications may be dealt with prior to introducing modifications into the non-isolated codebase.

Once the isolated codebase is in a desired form, the client computer 14 may instruct, via the virtual sandbox view 18, the service 16 to: merge changes of the isolated codebase into the non-isolated codebase, save the isolated codebase for subsequent use by an a new virtual sandbox session to be implemented at a later time, or wipe the modifications (e.g., by deleting the isolated codebase).

As may be appreciated, by centralizing the sandbox functionality, less network bandwidth may be used. For example, in the centralized virtual sandbox model, the isolated codebase may be stored in the same and/or nearby attached storage as the non-isolated codebase. Thus, codebase does not have to be transported between the client computer 14 and the service 16. Further, actual processing of differences in the isolated and non-isolated codebases may be processed by one centralized service, rather than implementing such differences at each local client computer 14. This centralization may result in significant processing efficiencies. Further, this solution may result in increased scalability, as a cloud environment 20 hosting the virtual sandbox service and/or code store may be expanded to increase processing power and/or storage capacity at one central location that may be used by numerous client computers 14, rather than increasing processing power and/or storage capacity at individual client computers 14.

Figure 2:
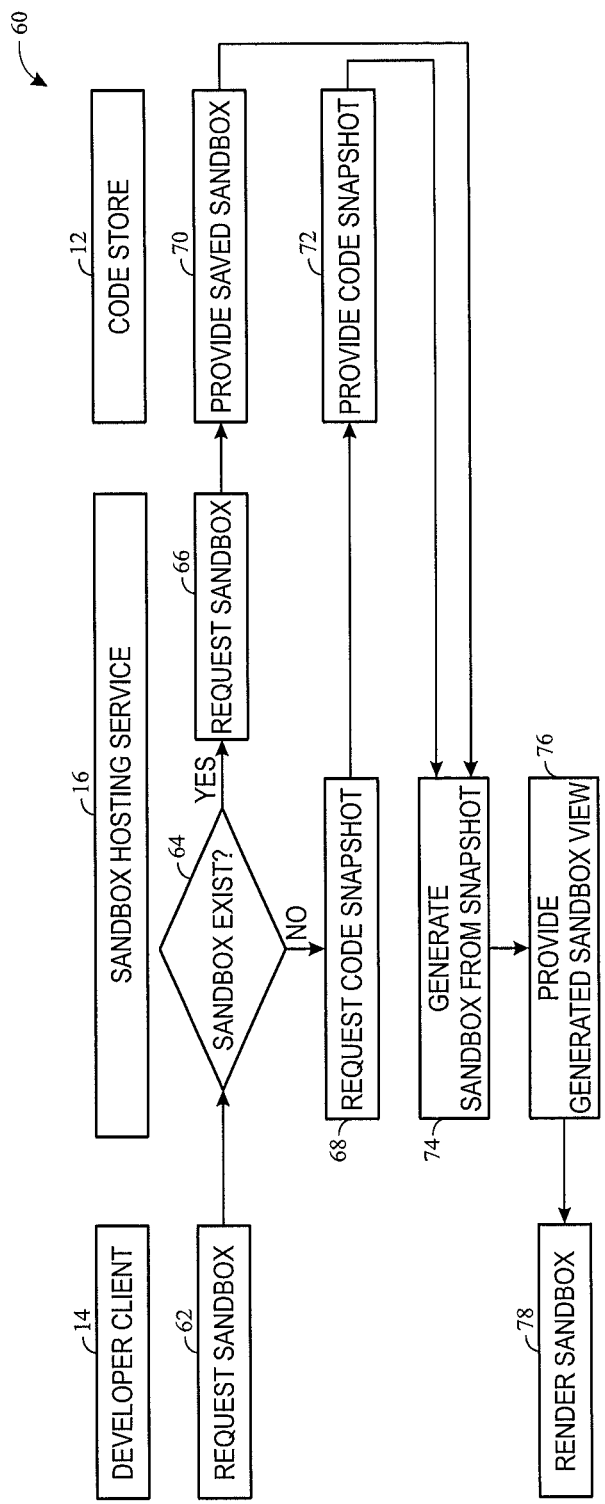
FIG. 2 is a swim lane diagram illustrating various processes for creating virtual sandboxes, in accordance with embodiments described herein.

FIG. 2 is a swim lane diagram illustrating a process 60 of interactions between the developer client computers 14, the sandbox hosting service 16, and the code store 12. The process 60 results in creating virtual sandboxes, in accordance with embodiments described herein.

The client computer 14 may initiate the process 60 by requesting a virtual sandbox (block 62). For example, the client computer 14 may provide a hyper-text-transport-protocol (HTTP) request over the Internet to the sandbox hosting service 16. The request may include information that may be useful to determine a particular codebase, preferences, etc. for the virtual sandbox.

The sandbox hosing service 16 may receive the request and may determine if a relevant sandbox already exists (decision block 64). If a virtual sandbox already exists, the sandbox hosting service 16 may request relevant information pertaining to the existing virtual sandbox (block 66). For example, the sandbox hosting service 16 may request a previously saved isolated snapshot of a codebase from the data store 12 (e.g., by querying the data store 12 using a primary key).

When no relevant sandbox exists, the sandbox hosting service may request data useful for creating a virtual sandbox, such as a snapshot of the non-isolated codebase (block 68). For example, the sandbox hosting service 16 may provide a freeze request, which may lock modifications to the non-isolated codebase and request a copy of the non-isolated codebase.

Based upon the request from either block 66 or block 68, the code store 12 may provide the relevant data. For example, in response to a request from block 66, the code store 12 may provide saved sandbox data (e.g., a saved snapshot of an isolated codebase) to the sandbox hosting service 16 (block 70). Further, based upon a request from block 68, the code store 12 may provide a new snapshot of the non-isolated codebase (block 72).

In either case (provision of data from block 70 or block 72), the sandbox hosting service 16 may generate a virtual sandbox from the provided data (block 74). For example, the sandbox hosting service 16 may intake and process the data provided by the code store 12 to implement a development and execution environment that is executed at the sandbox hosting service 16. For example an integrated development environment (IDE) that includes a source code editor, build automation tools, and/or a debugger may be generated and populated with the snapshot of codebase from the code store 12 (e.g., provided in blocks 70 or 72). The sandbox hosting service 16 may generate computer implementable instructions for rendering a view of the sandbox to the client computer 14. These instructions may be provided from the sandbox hosting service 16 to the client computer 14 (block 76).

Upon receiving the sandbox view instructions, the client computer 14 may render the virtual sandbox view (block 78). For example, the client computer 14 may render an interactive web page that illustrates the integrated development environment (IDE) hosted at the sandbox hosting service 16. As discussed in more detail herein, a user of the client computer 14 may interact with the view, affecting changes in the IDE.

Figure 3:
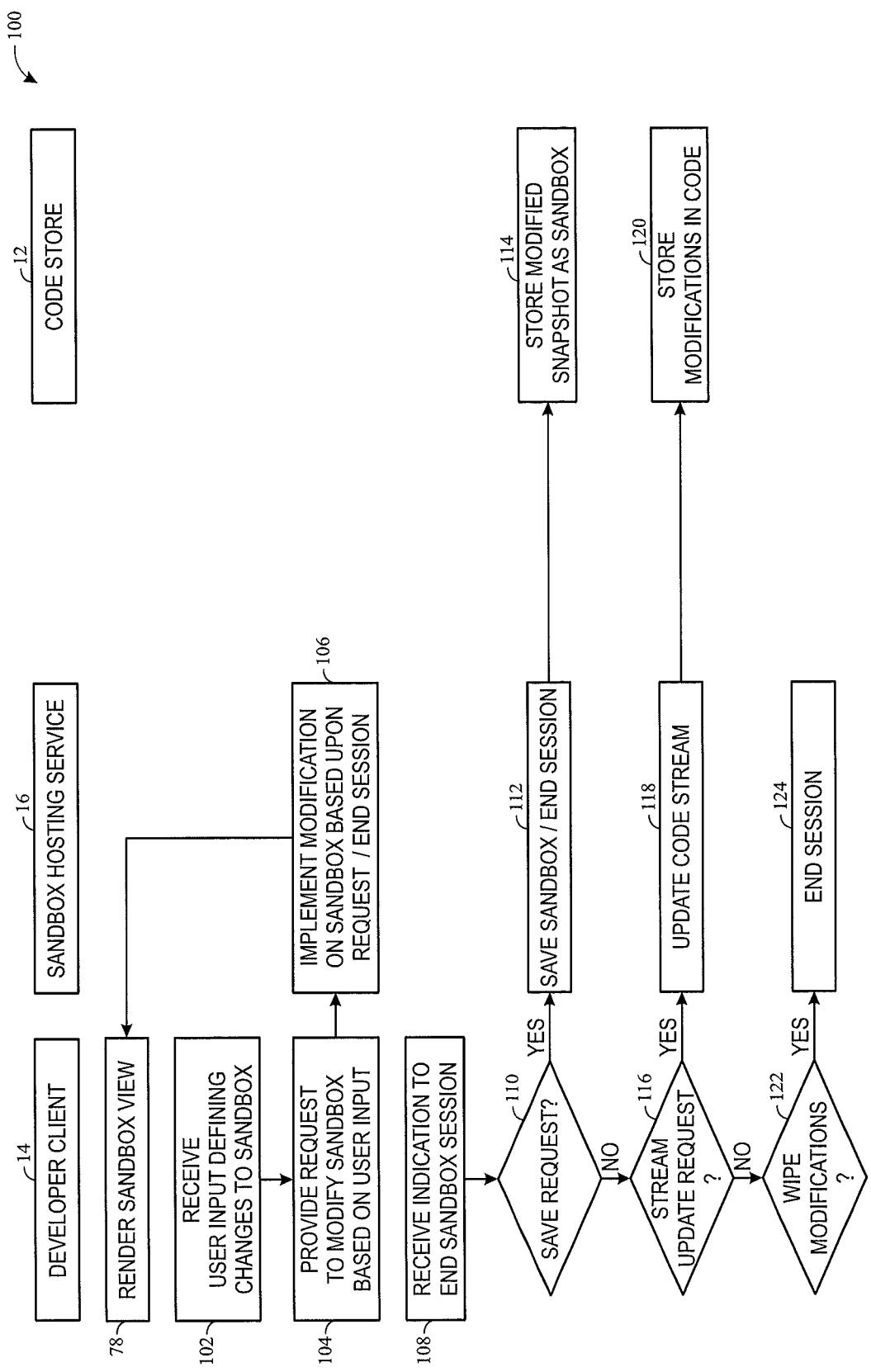
FIG. 3 is a swim lane diagram illustrating processes for making development modifications and applying the modifications using virtual sandboxes, in accordance with embodiments described herein.

FIG. 3 is a swim lane diagram illustrating a process 100 for making development modifications and applying the modifications using virtual sandboxes, in accordance with embodiments described herein. As mentioned above, the client computer 14 may render the virtual sandbox view 18 (block 78). As a user of the client computer 14 desires to make changes to the codebase via the IDE, the user may provide user inputs defining the changes to the codebase of the virtual sandbox (block 102). For example, the user may interact with the view 14 by using a mouse and/or keyboard to modify code of the codebase.

As the user inputs are received, the client computer 14 may provide a request to modify the virtual sandbox based upon the user inputs to the sandbox hosting service 16 (block 104). For example, HTTP post messages or other messages may be provided from the client computer 14 to the sandbox hosting service 16, requesting implementation of changes based upon the user inputs. In some embodiments, these requests may be cached, such that a set of instructions may be provided for a set of two or more user inputs. In such embodiments, the view 18 may be augmented by the client, while actual processing of the modifications on the codebase are not completed until the cached commands are implemented at the sandbox hosting service 16.

Upon receiving the requests from block 104, the sandbox hosting service 16 may implement the modifications based upon the requests (block 106). For example, the sandbox hosting service may modify the isolated codebase of the virtual sandbox, may compile and/or execute the isolated codebase of the virtual sandbox, may enter debugging mode, etc. Once the implementation is complete, the sandbox view may be updated and rendered (block 78).

Eventually, the user of the client computer 14 may desire to end the virtual sandbox session. Accordingly, the client computer may receive an indication to end the sandbox session from the user (block 108). For example, the user may select an option to merge changes with the non-isolated stream of the code store 12, may save the changes for use in a subsequent virtual sandbox session, may select an option to erase the modifications, or may simply select an option to exit the virtual sandbox view.

If a save request is received (decision block 110), the sandbox hosting service 16 may save the data for the virtual sandbox and end the virtual sandbox session (block 112). For example, the sandbox hosting service may cause the storage of a modified codebase in the code store 12 (block 114) to be persisted as a snapshot with the changes to the codebase, for later use.

Otherwise, if a merge (e.g., stream update) request is received (decision block 116), the sandbox hosting service may update the non-isolated codebase with the modifications made in block 106 (block 118, by storing the modification in the non-isolated code at the code store 12 (block 120).

Otherwise, if an erase (e.g., wipe) indication is received (decision block 122), the sandbox hosting service may end the session (block 124). For example, the sandbox hosting service may remove all data pertaining to the virtual sandbox and free up all processing threads associated with the virtual sandbox.

Many organizations have multiple sets of codebases for different projects, different platforms, and/or different stages of development. For example, a company may have different codebases for a quoting application, an ecommerce website, etc. Further, there may be different codebases for a mobile application versus a web-based application. Additionally, there may be a codebase for code that is in a production environment versus non-production environments, such as a development environment where new features are introduced. Because so many codebases may exist, it may be desirable to automatically determine relevant codebases that may be used in the virtual sandbox sessions based upon certain factors known at the time the virtual sandbox is generated.

Figure 4:
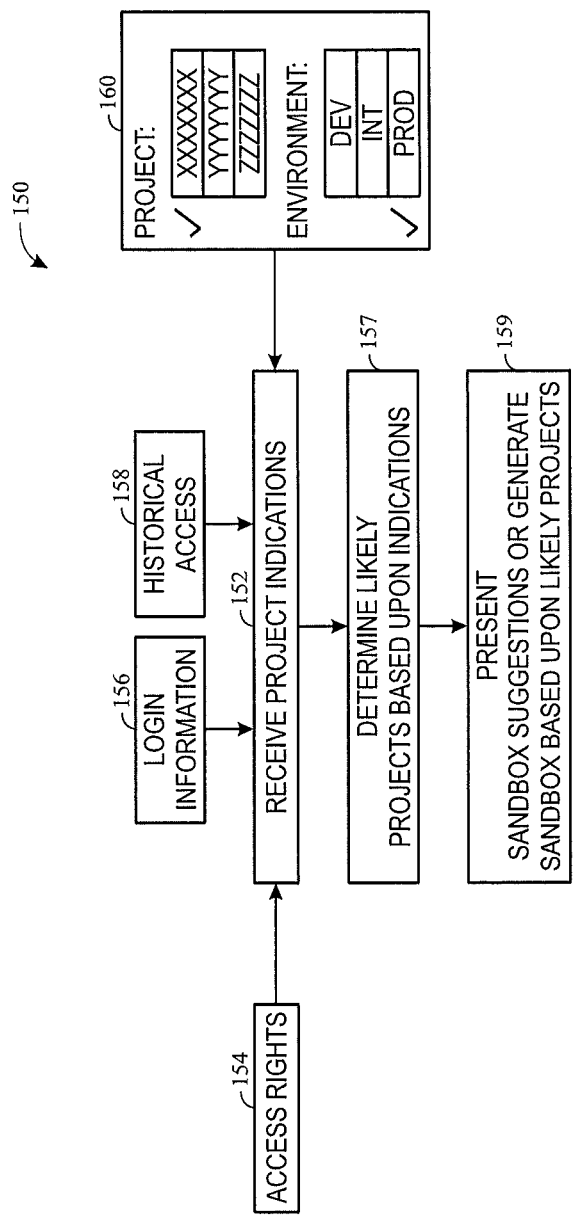
FIG. 4 is a flowchart illustrating a process for automatically selecting a project and/or environment code base for a virtual sandbox, in accordance with embodiments described herein.

FIG. 4 is a flowchart illustrating a process 150 for automatically selecting a project and/or environment codebase for a virtual sandbox, in accordance with embodiments described herein. The process 150 begins by receiving one or more data points that may provide an indication of particular codebases relevant to a user of the client computer (block 152). For example, access rights 154, login information 156, historical access 158, and/or user input selections 160 may be provided to the sandbox hosting service 16.

Based upon these indications, the sandbox hosting service 16 (or other computer processor) may determine projects that are likely relevant to the user (block 157). For example, the user's login information 156 may be associated with a particular project or project codebase or may at least identify the user, such that projects, platforms (e.g., mobile or desktop computing) and/or environments (e.g., development, integration, and/or production environments) associated with the user may be identified.

Access rights 154 of the user may also provide a relevant project, platform, and/or environment indication, by identifying particular codebases the user has access to and particular codebases the user does not have access to. As may be appreciated, projects that the user has access to may more likely be relevant projects for the user.

Further, login information 156 and/or data associated with login information 156 may be used to determine a set of particular projects, platforms, and/or environments relevant to a user of the client computer 14. For example, Active Directory, is a directory service developed by Microsoft® that authenticates and/or authorizes users and computers in a Windows® domain. Active Directory organizes objects (e.g., resources, such as printers and/or security principles, such as user login accounts) into Organizational Units (OUs). Group policies may be implemented at any given level of an OU. Accordingly, in some implementations, security principles (e.g., user login accounts) are organized according to particular teams, projects, functional tasks, etc. Thus, placement of user login information in the OUs may indicate a particularly relevant project, platform, and/or environment for a virtual sandbox. For example, if a user account is placed in an "Automotive Team" OU, the relevant projects may be filtered to only include projects associated with the Automotive Team.

Further, when the user account is placed in a "sustaining team" OU, this may indicate that the developer is responsible for bug fixes on production codebases rather than new development of new features. Accordingly, the most relevant development environment for the sustaining team member may be the production environment codebase, as opposed to a development team member, who might receive a development environment codebase.

Additionally, the placement of the user account in a particular OU may indicate a particular platform codebase. For example, a user account may be in a "Mobile Device Platform" OU or a "Desktop/Laptop Computing Platform" OU, which might indicate a particular platform codebase relevant to the user/user account.

Historical project access 158 may also provide an indicator as to particularly relevant projects. For example, in many instances, projects that a user has previously accessed (e.g., via a virtual sandbox of the virtual sandbox hosting service 16) are more likely to be relevant to the user than projects not previously accessed.

In some embodiments, prior to generation of the virtual sandbox, the client computer 14 may be provided with a project, platform, and/or environment selection graphical user interface that enables the user to provide explicit user input selections 160 regarding the project, platform, and/or environment selection that should be used when generating the virtual sandbox.

Based upon the determined projects, platforms, and/or environments that are likely to be relevant to the user of the client computer 14, the sandbox hosting service 16 may present one or more virtual sandbox suggestions for a relevant project, platform, and/or environment, or may automatically generate a virtual sandbox if there is a clear indication of a particularly relevant project, platform, and/or environment (block 159).

Figure 5:
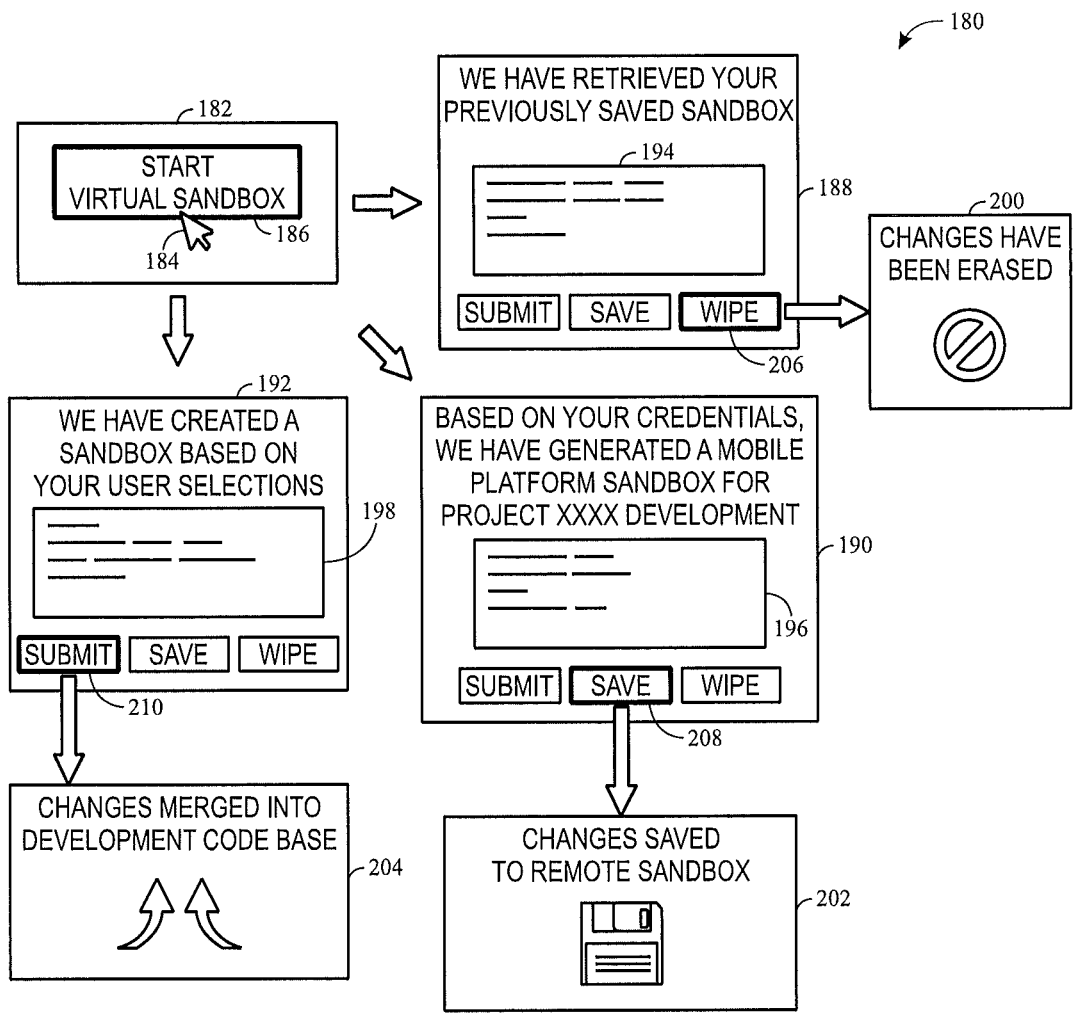
FIG. 5 is a schematic diagram illustrating various graphical user screens outputted from the process of FIG. 4, in accordance with embodiments described herein.

FIG. 5 is a schematic diagram 180 illustrating various graphical user screens outputted from the process of FIG. 4, in accordance with embodiments described herein. As mentioned above, an indication to start a virtual sandbox may be received via a client computer 14. For example, screen 182 illustrates a mouse-click 184 on a "Start Virtual Sandbox" icon 186. Based upon this event, the client computer 14 may request a new virtual sandbox session.

Screens 188, 190, and 192 illustrate various screens that may be rendered after a start virtual sandbox request is received by the virtual sandbox hosting service 16. For example, screen 188 illustrates an embodiment where a previously saved virtual sandbox session is available and is retrieved and rendered with a previously modified isolated codebase. Screen 190 provides an automatically-generated new virtual sandbox with a new isolated codebase 196 that is sourced from an automatically detected project "XXXX," automatically detected platform "mobile platform," and the environment "development environment."

As discussed above, the relevant program, platform, and/or environment producing the new isolated codebase 190 may be derived from a number of factors including access rights of a user, login information (e.g., active directory OU placement, etc.), historical access, and/or user input selections. Screen 192 provides an embodiment, where the new isolated codebase 198 is derived from user-input selections.

Screens 200, 202, and 204 illustrate examples of results of ending a virtual sandbox. When a "wipe" indication is received via the screens, such as via a wipe icon 206, the isolated codebase may be erased and an indication of the erasure may be presented (e.g., as in screen 200). When a "save" indication is received, such as by the save icon 208, the isolated codebase may be saved and an indication of the save may be presented (e.g., as in screen 202). Further, when a submit or merge indication is received, such as via the "Submit" icon 210, the codebase changes may be inserted into a non-isolated stream and an indication of the merging of the isolated codebase into the non-isolated codebase may be presented (e.g., as in screen 204).

As may be appreciated, the current embodiments result in efficient software development and computer or network operation. For example, sandbox creation does not require movement of code to a local development environment. Further, user-knowledge discerned by the system enables more secure and efficient creation of a development sandbox, along with more secure software deployment capabilities from the sandbox. Accordingly, the current embodiments provide efficiency enhancements to the performance of the computer systems described herein.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A tangible, non-transitory, machine-readable medium, comprising machine-readable instructions to:
    receive, at a centralized virtual sandbox hosting service, an electronic request from a remote client computer, the electronic request requesting a virtual sandbox session for a user of the remote client computer;
    in response to the received request, determine:

a historical access of the user to a previous project; and
a particular project of a plurality of projects based on the historical access and without a user selection of the particular project;
based upon the particular project, isolate a particular codebase from a non-isolated codebase, wherein the particular codebase and the non-isolated codebase are stored at a code store, wherein the particular codebase is associated with the particular project of the plurality of projects;
generate, at the centralized virtual sandbox hosting service, a virtual sandbox, the virtual sandbox configured to provide an integrated development environment for the particular codebase;
present to the remote client computer a virtual sandbox view, the virtual sandbox view enabling the user of the remote client computer to see and perform interactions with the integrated development environment at the centralized virtual sandbox hosting service, via the remote client computer;
generate a save option in the virtual sandbox view;
upon receiving an indication of a selection of the save option, save the virtual sandbox;
receive, at the centralized virtual sandbox hosting service, a subsequent electronic request from the remote client computer, the subsequent electronic request requesting a subsequent virtual sandbox session; and
present to the remote client computer a subsequent virtual sandbox view based on the saved virtual sandbox.

2. The tangible, non-transitory, machine-readable medium of claim 1, comprising instructions to determine the particular project by:
determining a user access account of the user; and
determining the particular project based upon the user access account of the user.

3. The tangible, non-transitory, machine-readable medium of claim 2, comprising instructions to determine the particular project by:
determining one or more Organizational Units (OUs) the user access account belongs to; and
determining the particular project based upon the one or more OUs the user access account belongs to.

4. The tangible, non-transitory, machine-readable medium of claim 1, comprising instructions to determine the particular project by:
determining access rights of the user to a project; and
determining the particular project based upon the access rights.

5. The tangible, non-transitory, machine-readable medium of claim 1, comprising instructions to:
generate a wipe option in the virtual sandbox view; and
upon receiving an indication of a selection of the wipe option, wiping the interactions with the integrated development environment at the centralized virtual sandbox hosting service that are made during a current session of the virtual sandbox view.

6. The tangible, non-transitory, machine-readable medium of claim 1, wherein the electronic request does not indicate the particular project.

7. The tangible, non-transitory, machine-readable medium of claim 1, comprising instructions to save the virtual sandbox by saving modifications generated by the interactions with the integrated development environment at the centralized virtual sandbox hosting service that are made during a current session of the virtual sandbox view to the particular codebase.

8. The tangible, non-transitory, machine-readable medium of claim 7, wherein the subsequent virtual sandbox view comprises the modifications generated by the interactions performed within the integrated development environment during the current session.

9. The tangible, non-transitory, machine-readable medium of claim 1, comprising instructions to automatically select the particular project from one or more projects associated with the user.

10. The tangible, non-transitory, machine-readable medium of claim 9, comprising instructions to automatically generate the virtual sandbox upon determining the particular project.

11. A computer-implemented method, comprising:
providing, to a centralized virtual sandbox hosting service, an electronic request from a remote client computer, the electronic request requesting a virtual sandbox session;
receiving, at the remote client computer, data indicative of a virtual sandbox view, the virtual sandbox view enabling a user of the remote client computer to see and perform interactions with an integrated development environment at the centralized virtual sandbox hosting service, via the remote client computer;
rendering, via the remote client computer, the virtual sandbox view, wherein the virtual sandbox view is representative of a virtual sandbox generated at the centralized virtual sandbox hosting service, the virtual sandbox providing the integrated development environment for modifications to a particular codebase isolated from a non-isolated codebase, wherein the particular codebase and the non-isolated codebase are stored at a data store, wherein the particular codebase is associated with a particular project of a plurality of projects and is determined based on the particular project, wherein the particular project is automatically determined based on a historical access of a user of the remote client computer to a previous project and without a user selection of the particular project;
generate a save option in the virtual sandbox view;
upon receiving an indication of a selection of the save option, saving the virtual sandbox;
receiving, at the centralized virtual sandbox hosting service, a subsequent electronic request from the remote client computer, the subsequent electronic request requesting a subsequent virtual sandbox session; and
presenting to the remote client computer a subsequent virtual sandbox view based on the saved virtual sandbox.

12. The computer-implemented method of claim 11, comprising:
providing a user access account of the user in the electronic request; and
determining the particular project based upon the user access account of the user.

13. The computer-implemented method of claim 12, comprising:
providing one or more Organizational Units (OUs) the user is associated with in the electronic request; and
determining the particular project based upon the one or more Organizational Units (OUs).

14. A development system, comprising:
a sandbox hosting service, configured to:
receive an electronic request from a remote client computer, the electronic request requesting a virtual sandbox session for a user of the remote client computer;

determine a historical access of the user to a previous project;
determine a particular project of a plurality of projects based on:
the received electronic request; and
the historical access, wherein the particular project is determined without a user selection of the particular project;
isolate, based on the particular project, a particular codebase from a non-isolated codebase, wherein the particular codebase and the non-isolated codebase are stored at a code store, wherein the particular codebase is associated with the particular project of the plurality of projects; and
generate a virtual sandbox, the virtual sandbox configured to provide an integrated development environment for the particular codebase; and
a remote client computer, configured to:
render a virtual sandbox view of the virtual sandbox; and
receive and provide interactions with the integrated development environment at the virtual sandbox hosting service, via the virtual sandbox view;
wherein the sandbox hosting service is further configured to:
generate a save option in the virtual sandbox view;
upon receiving an indication of a selection of the save option, save the virtual sandbox;
receive, a subsequent electronic request from the remote client computer, the subsequent electronic request requesting a subsequent virtual sandbox session; and
generate a subsequent virtual sandbox view based on the saved virtual sandbox.

15. The development system of claim 14, wherein the virtual sandbox view comprises a wipe option; and
upon receiving an indication of a selection of the wipe option from the remote client computer, the sandbox hosting service is configured to wipe the interactions with the integrated development environment that are made during a current session of the virtual sandbox view.

16. The development system of claim 14, wherein the virtual sandbox view comprises a merge option in the virtual sandbox view; and
upon receiving an indication of a selection of the merge option from the remote client computer, the sandbox hosting service is configured to merge the interactions with the particular codebase.

17. The development system of claim 14, wherein the sandbox hosting service is configured to select the integrated development environment from a plurality of integrated development environments, comprising: development, integration, and production environments, based upon one or more characteristics of a requestor operating the remote client computer.

18. The development system of claim 14, wherein the sandbox hosting service is further configured to save the virtual sandbox by saving the interactions with the integrated development environment at the centralized virtual sandbox hosting service that are made during a current session of the virtual sandbox view to the particular codebase.

19. The development system of claim 14, wherein the subsequent electronic request from the remote client computer is indicative of a request to access the saved virtual sandbox.

20. The development system of claim 14, wherein the sandbox hosting service is configured to determine the particular project by:
determining a user access account of the user; and
determining one or more organizational units (OUs) the user access account belongs to; and
determining the particular project based upon the one or more OUs the user access account belongs to.

\* \* \* \* \*